United States Patent
Menardo

(10) Patent No.: US 12,269,562 B2
(45) Date of Patent: Apr. 8, 2025

(54) PROCESS FOR THE PRODUCTION OF A BLANK OF AN ITEM, IN PARTICULAR A BLANK OF A DYNAMIC SEAL, CONFIGURED FOR EQUIPPING A ROTATING JOINT OF AN INSTALLATION FOR MINING FLUIDS, IN PARTICULAR ON AN OFFSHORE PLATFORM

(71) Applicant: ETI GROUP, Gemenos (FR)

(72) Inventor: Philippe Menardo, Beaulieu-sur-Mer (FR)

(73) Assignee: ETI GROUP, Gemenos (FR)

( * ) Notice: Subject to any disclaimer, the term of this patent is extended or adjusted under 35 U.S.C. 154(b) by 0 days.

(21) Appl. No.: 18/350,425

(22) Filed: Jul. 11, 2023

(65) Prior Publication Data
US 2024/0017798 A1 Jan. 18, 2024

(30) Foreign Application Priority Data
Jul. 12, 2022 (FR) ...................................... 2207178

(51) Int. Cl.
E21B 19/00 (2006.01)
B29C 70/34 (2006.01)
B63B 27/30 (2006.01)
B29K 27/18 (2006.01)
B29K 71/00 (2006.01)

(52) U.S. Cl.
CPC .............. B63B 27/30 (2013.01); B29C 70/34 (2013.01); E21B 19/002 (2013.01); *B29K 2027/18* (2013.01); *B29K 2071/00* (2013.01)

(58) Field of Classification Search
CPC . E21B 19/002; E21B 19/004; B29K 2027/18; B29K 2071/00
See application file for complete search history.

(56) References Cited

U.S. PATENT DOCUMENTS 3,042,574 A * 7/1962 Hochberg ............... B32B 37/00
  156/286
5,494,301 A * 2/1996 Hamilton .............. B29C 55/005
  277/944
6,032,960 A * 3/2000 Wendl .................... F16J 15/108
  277/627

(Continued)

FOREIGN PATENT DOCUMENTS

CN 105937623 A 9/2016
KR 20170047758 A 5/2017

OTHER PUBLICATIONS

Search Report for FR2207178 dated Apr. 21, 2023, 6 pages.

*Primary Examiner* — Matthew R Buck
(74) *Attorney, Agent, or Firm* — NIXON & VANDERHYE

(57) ABSTRACT

Disclosed is a process for producing a blank from an item that is configured to equip a rotating-joint device of an installation for mining fluids, in particular on an offshore platform, including the following steps: providing at least one strip of a predetermined material; providing at least one production support that is at least partially annular and that has a predetermined outer diameter; arranging the at least one strip of a predetermined material around the production support until a predetermined thickness is obtained; and removing the production support to obtain the item blank that has a predetermined cross-section.

34 Claims, 3 Drawing Sheets

(56) References Cited

U.S. PATENT DOCUMENTS

| | | | |
|---|---|---|---|
| 9,605,786 B2 | 3/2017 | Boatman et al. | |
| 9,701,058 B2* | 7/2017 | Valle | B29D 99/0085 |
| 2002/0070024 A1* | 6/2002 | Schutz | E21B 33/038 |
| | | | 166/350 |
| 2004/0232624 A1* | 11/2004 | Hisano | F16J 15/104 |
| | | | 277/500 |
| 2005/0225037 A1* | 10/2005 | Dove | F16J 15/022 |
| | | | 277/610 |
| 2017/0120519 A1* | 5/2017 | Mark | B33Y 70/00 |

* cited by examiner

PROCESS FOR THE PRODUCTION OF A BLANK OF AN ITEM, IN PARTICULAR A BLANK OF A DYNAMIC SEAL, CONFIGURED FOR EQUIPPING A ROTATING JOINT OF AN INSTALLATION FOR MINING FLUIDS, IN PARTICULAR ON AN OFFSHORE PLATFORM

This application claims priority to FR Patent Application No. 2207178 filed Jul. 12, 2022, the entire contents of which is hereby incorporated by reference.

BACKGROUND OF THE INVENTION

Field of the Invention

The invention relates to the installations for mining fluids, for example hydrocarbons, for example on offshore-type platforms, and in particular the items, preferably of the annular type, which can be used in such installations.

In particular, the object of the invention is a process for producing a blank of such an item, including, for example, a blank of the rotating joint or else a structural piece of the rotating joint from among a part and/or a part that moves relative to the stationary part.

The objects of the invention are also such item blanks produced by implementing the process.

Description of the Related Art

The rotating-joint devices installed in pressurized installations can be used in the offshore field, for example in the ships for oil production, making it possible in particular to exploit offshore hydrocarbon fields. Floating units for production, storage, and unloading can be formed by a ship that can move, because of its environment, around a mooring turret that is geostationary. The ship can be secured temporarily to the turret. The installations can comprise pipes that form a network of underwater ducts and that allow fluid communication for the transfer of a fluid between the sea floor and the ship.

To ensure sealing between the ship and the turret and thus to ensure the integrity of the fluid transfer, the rotating-joint devices are equipped with a so-called stationary first part, secured to the turret, and a so-called mobile second part, secured to the ship. The second part of the rotating-joint devices therefore rotates relative to the first part of the rotating-joint devices. The rotating-joint devices are also equipped with multiple dynamic sealing elements, so-called dynamic seals, housed in spaces made between the first stationary part and the second mobile part of the rotating-joint devices.

Such dynamic sealing elements can comprise, for example, lips that have the function of ensuring sealing with respect to fluid.

Whether these are dynamic seals or stationary and mobile parts, and even other pieces equipping the rotating-joint device, use in installations for mining fluids generates constraints in terms of dimensions, often large, and also in terms of materials, because these pieces are subjected to a harsh, often marine, environment, making their production rather complex.

Known, for example, is a production process in which blanks of pieces, or items, equipping the rotating-joint devices, are formed by sintering starting from a powder of a predetermined material that is pressed into a mold, then heated up to a glass transition temperature, then cooled to form the blank, also called unmanufactured raw material.

Also known is a production process in which blanks of pieces, or items, are formed by extrusion from granules of a predetermined material; said granules are heated and then extracted from a die in the form of coils or circular sectors, for example with a rectangular cross-section, which are cut and then welded to one another to form the blank or unmanufactured raw material.

SUMMARY OF THE INVENTION

The invention relates to a process for producing a blank of an item configured for equipping a rotating joint of an installation for mining fluids, in particular on an offshore platform, which is simple, convenient, and economical.

The invention thus has as its object, in a first embodiment, a process for producing a blank from an item that is configured to equip a rotating-joint device of an installation for mining fluids, in particular on an offshore platform, comprising the following steps:

Providing at least one strip of a predetermined material;

Providing at least one production support that is at least partially annular and that has a predetermined outer diameter;

Arranging said at least one strip of a predetermined material around said production support until a predetermined thickness is obtained;

Removing the production support to obtain said item blank that has a predetermined cross-section.

The above process makes it possible to produce in a simple and convenient manner a blank of an annular item that is designed to equip a rotating-joint device by simply arranging at least one strip of a predetermined material on a dedicated support. It is possible to produce a blank with a tailored and predetermined cross-section.

Preferred, simple, convenient, and economical characteristics of the process according to the invention are presented below.

The process can comprise the step of providing multiple strips of different materials and the step of arranging the strips of different materials on the production support successively, sequentially, or in parallel, in a superposed and/or juxtaposed manner.

The predetermined material is formed from at least one thermoplastic.

The thermoplastic consists of at least one polyether ether ketone, referred to as PEEK, and/or derivative materials.

The thermoplastic also consists of at least one polytetrafluoroethylene, referred to as PTFE, and/or derivative materials.

The predetermined material is also formed from high-strength fibers and/or metal wires.

The process can comprise the step of arranging said at least one strip of a predetermined material around said production support under vacuum conditions.

The process can comprise the step of arranging said at least one strip of a predetermined material around said production support under a predetermined temperature.

The process can comprise, during the step of arranging said at least one strip of a predetermined material around said production support, a step of welding a lower layer formed by the strip with an upper layer formed by the strip.

The process can comprise, during the step of arranging said at least one strip of a predetermined material around said production support, a step of bonding a lower layer formed by the strip with an upper layer formed by the strip.

The production support can be formed by a single annular piece.

The production support can be formed from multiple annular segments.

The process can comprise, during the step of arranging said at least one strip of a predetermined material around said production support, a step of positioning an insert designed to house a receiving cavity inside the item blank.

The insert can be formed from a soluble material that can be eliminated by a physico-chemical process.

The item blank is a blank of an annular dynamic sealing element of the rotating-joint device.

The item blank is a blank of a first annular part of the rotating-joint device and/or a blank of a second annular part of the rotating-joint device configured to rotate relative to said first annular part.

The at least one strip of a predetermined material comes as a roll or individual strip.

An object of the invention is also, in one embodiment, an item blank obtained by implementing the process described above.

An object of the invention is also, in yet another embodiment, an installation for mining fluids, for example a hydrocarbon, and in particular on an offshore platform, comprising at least one rotating-joint device that has at least one dynamic sealing element housed inside a separating space located between a first annular part that is secured to a stationary mooring turret of said installation and a second annular part that rotates relative to said first annular part and that is secured to a mobile ship of said installation, with at least one among the dynamic sealing element, the first part and the second part that is obtained from a blank as described above.

The blank is formed by the dynamic sealing element and is produced on a production support formed directly by one or the other of the first part and the second part.

The production support can be formed from multiple annular segments and placed temporarily and in an in-situ manner between two rotating-joint devices assembled one on the other.

BRIEF DESCRIPTION OF THE DRAWINGS

The disclosure of the invention will now be continued by the description of embodiments, given below in an illustrative and non-limiting way, with reference to the accompanying drawings.

DETAILED DESCRIPTION

Figure 1:
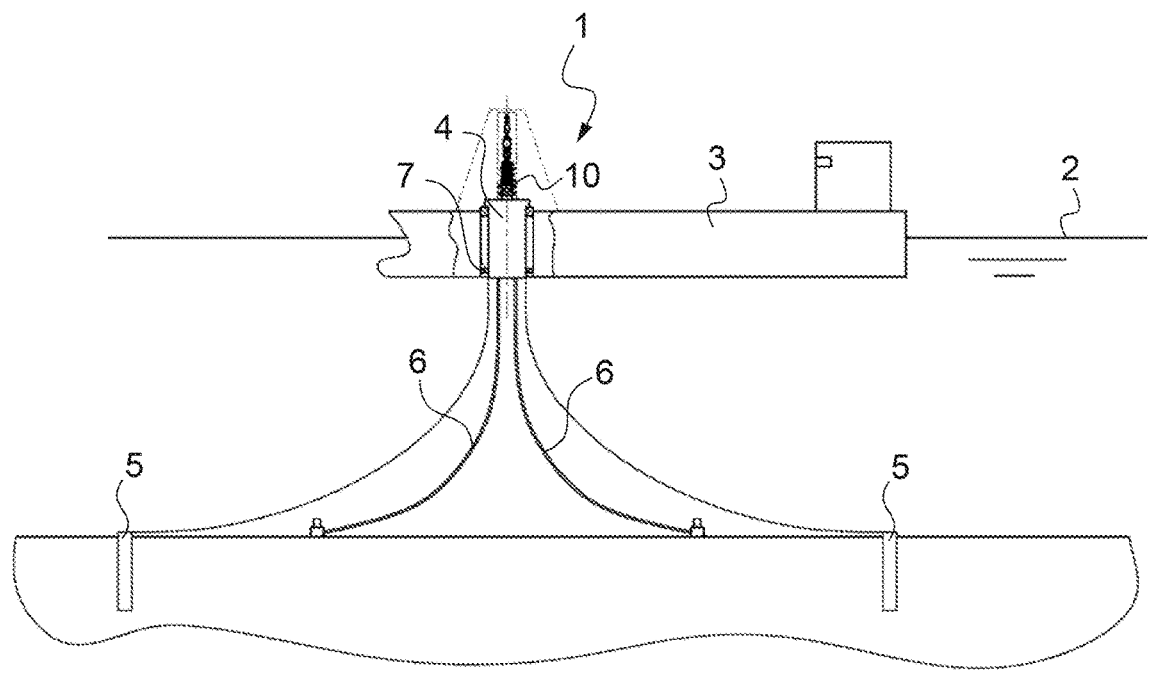
FIG. 1 shows diagrammatically and partially an installation for mining fluids on an offshore platform, equipped with a ship, a mooring turret, a network of underwater ducts allowing fluid communication for the transfer of fluid between the sea floor and the ship, and a rotating-joint device ensuring the sealing between the ship and the turret and the integrity of the fluid transfer.

FIG. 1 illustrates a fluid mining installation 1 on an offshore platform, making it possible to exploit offshore hydrocarbon fields 2.

This installation 1, also called a floating unit for production, storage, and unloading, can be equipped with a ship 3 that is mobile, because of its environment formed by the sea 2, and with a mooring turret 4 that is geostationary and around which the ship 3 can move.

The mooring turret 4 can be, for example, secured mechanically to the sea floor 2 via underwater anchors 5.

The ship 3 can be mobile relative to the mooring turret 4 by means of a bearing mechanism 7.

The installation 1 can be equipped with pipes 6 that form a network of underwater ducts that allow fluid communication for the transfer of fluid between the sea floor and the ship 3.

The fluid circulating in the pipes 6 comes from the sea floor 2.

The installation 1 comprises a rotating-joint device 10 ensuring the sealing between the ship 3 and the mooring turret 4 and the integrity of the fluid transfer.

The rotating-joint device 10 can be formed by a rotating joint ("swivel device" in the English terminology) or a stack of such joints ("swivel stack device" in the English terminology).

Figure 2:
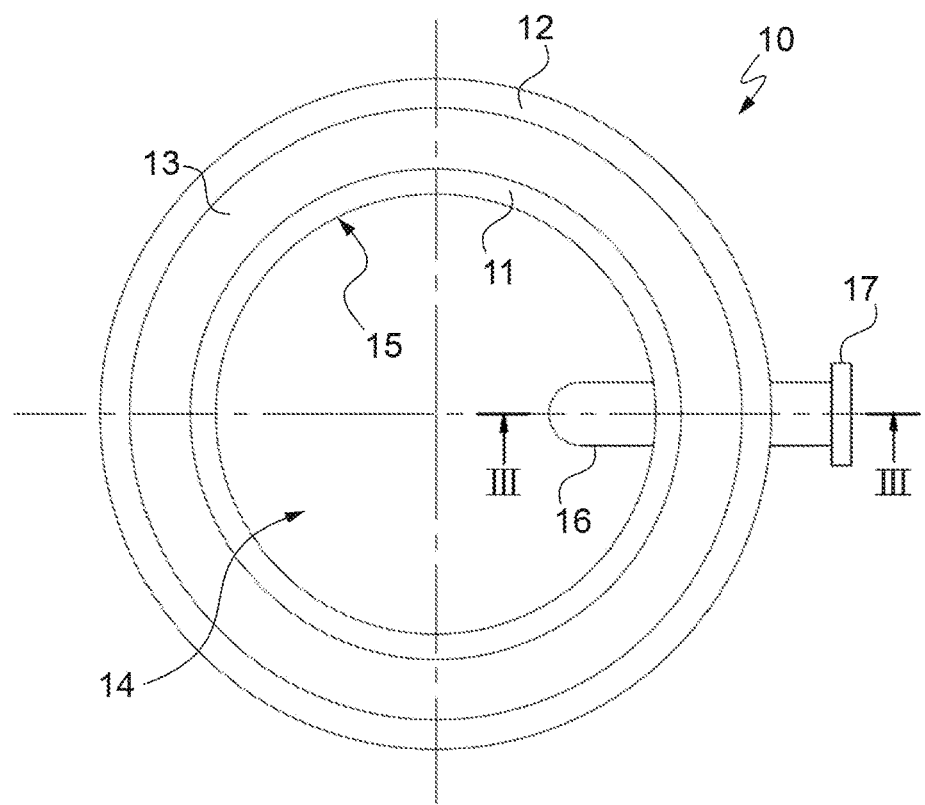
FIG. 2 is a top view of the rotating-joint device of the installation illustrated in FIG. 1.

As illustrated in FIG. 2, such a rotating-joint device 10 is annular overall and comprises a first so-called stationary annular part 11, which is configured to be secured to the mooring turret 4, as well as a second so-called mobile annular part 12, which is configured to be secured to the ship 3.

In the example described, the second annular part 12 rotates relative to the first annular part 11, by means of a bearing element 13 that is at least partially inserted between the first and second annular parts 11 and 12.

The rotating-joint device 10 has an inner space 14 defined here by an inner surface 15 of the first annular part 11.

The installation 1 also comprises a transfer pipe 16 connected, directly or indirectly, to at least one of the underwater pipes 6.

The transfer pipe 16 enters into the rotating-joint device 10 via its inner space 14 and emerges from the rotating-joint device 10 via an outlet connection 17.

The transfer pipe 16 thus passes through the rotating-joint device 10 by entering into the first annular part 11 and by exiting through the second annular part 12.

Figure 3:
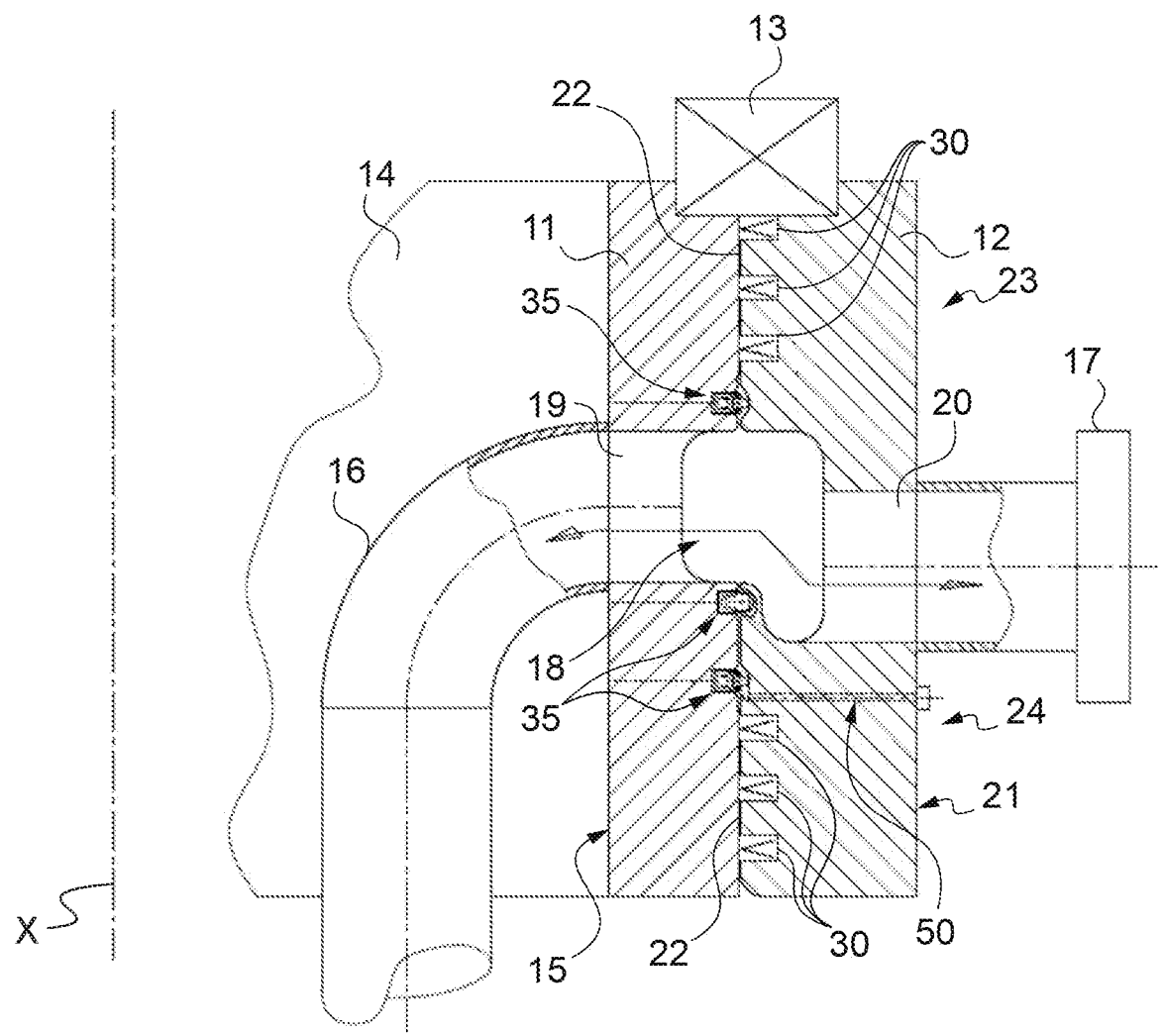
FIG. 3 is a partial cutaway view of the rotating-joint device, referenced III-III in FIG. 2.

FIG. 3 shows in section the rotating-joint device 10 of FIG. 2 and illustrates in greater detail the fluid path through the rotating-joint device 10 and the engagement between the first and second annular parts 11 and 12.

The rotating-joint device 10 is equipped with a transfer chamber 18 partially formed by a first opening 19 housed in the first annular part 11 and by a second opening 20 housed in the second annular part 12 and at least partially facing the first opening 19.

The transfer chamber 18 is annular or toroidal here.

The first opening 19 emerges at the inner surface 15 of the first annular part 11 in a first portion of the transfer pipe 16 that is located in the inner space 14 of the rotating-joint device 10 and that is connected to the underwater pipes 6.

The second opening 20 emerges at an outer surface 21 of the second annular part 12 into a second portion of the transfer pipe 16 that is located outside of the rotating-joint device 10 and that comprises the outlet connection 17.

An arrow illustrated in FIG. 3 shows the fluid path taken by the fluid coming from the pipes 6 and routed through the transfer pipe 16, passing through the first and second annular parts 11 and 12 of the rotating-joint device 10, up to the outlet connection 17.

The rotating-joint device 10 is also equipped with a separating space 22 located between the first annular part 11 and the second annular part 12.

The separating space 22 is designed to make possible the rotation of the second annular part 12 relative to the first annular part 11.

In the example described, the separating space 22 is interrupted by the transfer chamber 18.

Thus, on an upper portion 23 of the rotating-joint device 10, the separating space 22 extends from the bearing element 13 until emerging into the transfer chamber 18, while on a lower portion 24 of the rotating-joint device 10, the separating space 22 emerges at one end in the transfer chamber 18 and emerges at an opposite end outside of the rotating-joint device 10.

The transfer chamber 18 is inserted here between the upper and lower portions 23 and 24.

In particular, the separating space 22 is housed between an outer surface of the first annular part 11, which outer surface is opposite to its inner surface 15, and an inner surface of the second annular part 12, which inner surface is opposite to its outer surface 21.

The rotating-joint device 10 comprises dynamic sealing elements 30 housed at least partially inside the separating space 22, in the upper and lower portions 23 and 24 of the rotating-joint device 10.

These dynamic sealing elements 30 are designed to seal the separating space 22.

These dynamic sealing elements 30 can comprise, for example, lips that have the function of ensuring sealing with respect to fluid.

In the example described, three dynamic sealing elements 30 are housed at least partially inside the separating space 22 in the upper portion 23 of the rotating-joint device 10, and three dynamic sealing elements 30 are housed at least partially inside the separating space 22 in the lower portion 24 of the rotating-joint device 10.

The rotating-joint device 10 comprises in addition here multiple protective devices 35 of the dynamic sealing elements 30.

Alternatively, there could be more or fewer and not necessarily the same number in the upper and lower portions.

In the example described, a protective device 35 is housed at least partially inside the separating space 22 in the upper portion 23 of the rotating-joint device 10, and two protective devices 35 are housed at least partially inside the separating space 22 in the lower portion 24 of the rotating-joint device 10.

The rotating-joint device 10 can also comprise a cleaning device 50 configured to evacuate debris that said fluid may contain and that is formed here by a channel formed in the second annular part 12 and that emerges into the separating space 22 at a protective device 35.

Alternatively, there could be more or fewer protective devices and/or a cleaning device, or neither of them.

In such an installation 1, the dynamic sealing elements 30 are made from a blank, also called unmanufactured raw material.

Figure 4:
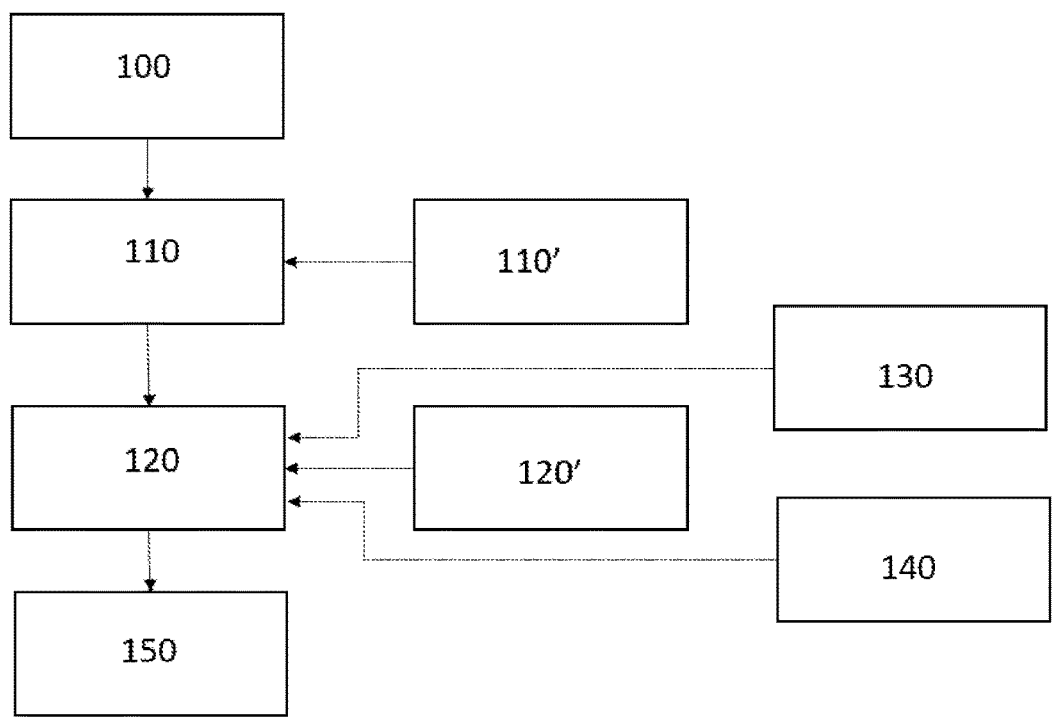
FIG. 4 is a block diagram illustrating a process for producing a blank of an item that is designed to equip a rotating-joint device such as the one of FIGS. 1 to 3.
Figure 5:
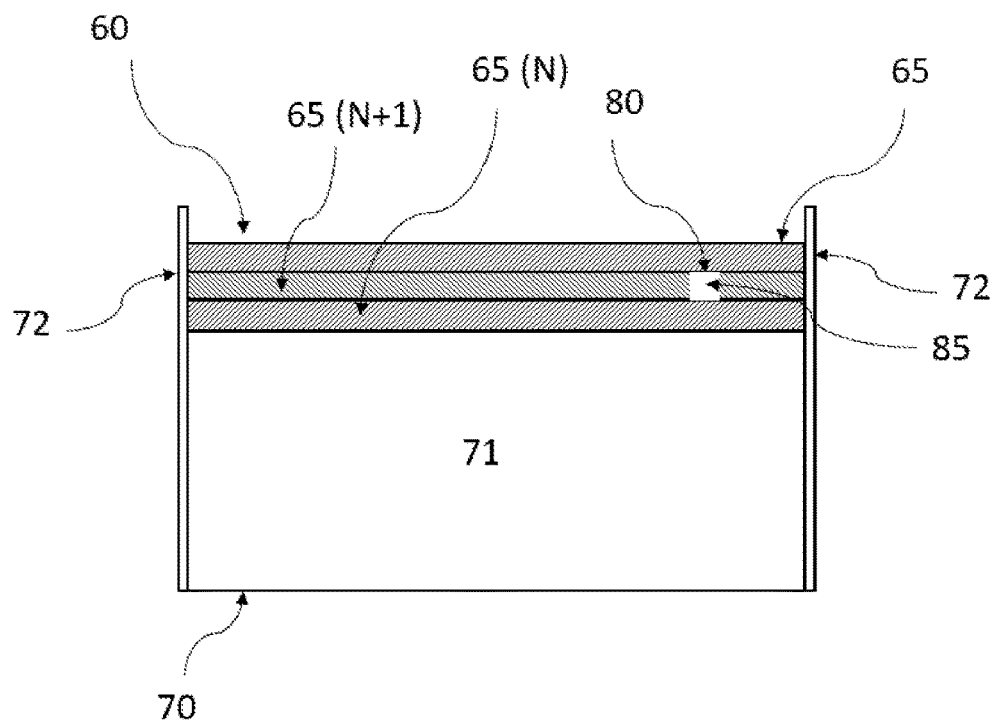
FIG. 5 very diagrammatically illustrates a production support on which is produced the item blank according to the process of FIG. 4.

FIGS. 4 and 5 show a process for producing such a blank 60.

This blank 60 can have dimensions that make it possible to produce therefrom, for example by machining, one or more dynamic sealing elements 30.

More generally, it can be a blank of an item configured to equip the rotating-joint device, which item can be formed by a dynamic sealing element, or else by at least one or the other of the first and second annular parts, and even by other pieces such as the transfer pipes.

This blank 60 can be made of predetermined material and in particular a synthetic polymer.

In particular, the predetermined material is formed from at least one thermoplastic, preferably consisting of at least one polyether ether ketone, referred to as PEEK, and/or derivative materials, and even optionally also at least polytetrafluoroethylene, referred to as PTFE, and/or derivative materials.

The blank 60 can also comprise high-strength fibers and/or metal wires.

The blank 60 can also comprise an adhesive bonding the different materials.

With reference to FIGS. 4 and 5, the process for producing the blank 60 comprises the step 100 for providing at least one strip 65 of a predetermined material, in particular mentioned above, and in particular PEEK.

It can be a strip 65 that comes as a roll or as a number of individual strips.

The process for producing the blank 60 also comprises the step 110 of providing at least one production support 70 that is at least partially annular and that has a predetermined outer diameter.

The production support 70 can be formed by a single annular piece or by multiple annular segments.

The production support 70 here comprises a primary chuck 71 and lateral flanges 72.

The process for producing the blank 60 also comprises the step 120 of arranging the strip or strips 65 around the primary chuck 71 and between the lateral flanges 72 of the production support 70 until a predetermined thickness on this support.

Optionally, the process for producing the blank 60 can comprise the step 110' of providing a number of strips of different materials, for example of PEEK and/or of PTFE, and/or with high-strength fibers and/or with metal wires, and the step 120' of arranging the strips of different materials on the production support successively, sequentially, or in parallel, in a superposed and/or juxtaposed manner.

The step 120, 120' of arranging the strip or strips 65 around the production support 70 can be carried out under vacuum conditions.

The step 120, 120' of arranging the strip or strips 65 around the production support 70 can be carried out under a predetermined temperature, for example close to a glass transition temperature of the predetermined material.

Optionally, the process for producing the blank 60 can comprise, during the step 120, 120' of arranging the strip or strips 65 around the production support 70, a step 130 of welding and/or bonding a lower layer formed by a strip N with an upper layer formed by a strip N+1, in such a way as to reinforce the mechanical connection between the superposed strips.

This same step 130 of welding and/or bonding can be carried out on strips that are arranged in an adjacent or juxtaposed manner.

It could be, for example, laser or ultrasound welding.

Optionally also, the process for producing the blank 60 can comprise, during the step 120, 120' of arranging the strip or strips 65 around the production support 70, a step 140 of positioning an insert 80.

The insert 80 can be formed by a soluble material that can be eliminated by a physico-chemical process.

Such an insert 80 can be designed to house a receiving cavity 85 inside the blank 60.

This cavity 85 can make it possible to house a particular shape of the dynamic sealing element or can be designed to house therein, for example, a control element of this dynamic sealing element.

The process for producing the blank 60 also comprises the step 150 of removing the production support 70 to obtain the blank 60 with a predetermined width and thickness, i.e., a predetermined cross-section.

In the example illustrated, the production support 70 on which the blank 60 is produced is an independent and separate piece of the rotating-joint device.

Alternatively, the production support can be formed directly by one or the other of the first annular part and the second annular part.

In other words, the blank could be produced right in the field, on the rotating-joint device equipping the installation.

Alternatively, the production support can be formed by multiple annular segments that are placed temporarily and in an in-situ manner between two rotating-joint devices 10, themselves assembled one on the other. The process described above makes it possible to produce, in a simple and convenient manner, a blank of an annular item designed to equip a rotating-joint device by simply arranging the strip or strips of a predetermined material on a dedicated support.

More generally, the invention is used in the ships or floating units of the offshore field, making it possible to produce and/or transform and/or process and/or store and/or unload fluids and/or energy, in particular electrical energy, and/or signals.

More generally, the invention is not limited to the examples described and shown.

The invention claimed is:

1. A process for producing at least one rotating-joint device configured to equip an installation for operating energy, the at least one rotating-joint device having at least one dynamic sealing element housed inside a separating space located between a first annular part that is secured to a stationary mooring turret of said installation and a second annular part that rotates relative to said first annular part and that is secured to a mobile ship of said installation, with at least one among the dynamic sealing element, the first part, and the second part that is obtained from an item blank obtained by implementing the production process which comprises the following steps:
   providing at least one strip of a predetermined material;
   providing at least one production support that is at least partially annular and that has a predetermined outer diameter;
   arranging said at least one strip of a predetermined material around said production support until a predetermined thickness is obtained;
   removing the production support to obtain said item blank that has a predetermined cross-section; and
   installing the produced item blank in the rotating-joint device of the installation for operating energy.

2. The process according to claim 1, further comprising providing multiple strips of different materials and the step of arranging the strips of different materials on the production support successively, sequentially, or in parallel, in a superposed and/or juxtaposed manner.

3. The process according to claim 1, wherein the predetermined material consists of polyether ether ketone, referred to as PEEK, and/or derivative materials.

4. The process according to claim 3, wherein the predetermined material also consists of polytetrafluoroethylene, referred to as PTFE, and/or derivative materials.

5. The process according to claim 1, further comprising arranging said at least one strip of a predetermined material around said production support under vacuum conditions.

6. The process according to claim 1, further comprising arranging said at least one strip of a predetermined material around said production support under a predetermined temperature.

7. The process according to claim 1, further comprising, during the step of arranging said at least one strip of a predetermined material around said production support, a step of welding and/or bonding a lower layer formed by the strip with an upper layer formed by the strip.

8. The process according to claim 1, wherein the production support is formed by a single annular piece or multiple annular segments.

9. The process according to claim 1, further comprising, during the step of arranging said at least one strip of a predetermined material around said production support, a step of positioning an insert designed to house a receiving cavity inside the item blank.

10. The process according to claim 9, wherein the insert is formed from a soluble material.

11. The process according to claim 1, wherein the item blank is a blank of the annular dynamic sealing element of the rotating-joint device, or the item blank is a blank of the first annular part of the rotating-joint device and/or a blank of the second annular part of the rotating-joint device configured to rotate relative to said first annular part.

12. The process according to claim 1, wherein the at least one strip of a predetermined material comes as a roll or individual strip.

13. The process according to claim 2, wherein the predetermined material consists of polyether ether ketone, referred to as PEEK, and/or derivative materials.

14. The process according to claim 2, further comprising arranging said at least one strip of a predetermined material around said production support under vacuum conditions.

15. The process according to claim 3, further comprising arranging said at least one strip of a predetermined material around said production support under vacuum conditions.

16. The process according to claim 4, further comprising arranging said at least one strip of a predetermined material around said production support under vacuum conditions.

17. The process according to claim 2, further comprising arranging said at least one strip of a predetermined material around said production support under a predetermined temperature.

18. An installation for operating energy comprising:
   at least one rotating-joint device that has at least one dynamic sealing element housed inside a separating space located between a first annular part that is secured to a stationary mooring turret of said installation and a second annular part that rotates relative to said first annular part and that is secured to a mobile ship of said installation,
   with at least one among the dynamic sealing element, the first part, and the second part that is obtained from an item blank obtained by implementing a production process for producing the item blank that is configured to equip the rotating-joint device, the production process comprising the following steps:
      providing at least one strip of a predetermined material;
      providing at least one production support that is at least partially annular and that has a predetermined outer diameter;

arranging said at least one strip of a predetermined material around said at least one production support until a predetermined thickness is obtained; and removing said at least one production support to obtain said item blank that has a predetermined cross-section.

19. The installation according to claim 18, wherein said item blank is formed by the dynamic sealing element and is produced on a production support formed directly by one or the other of the first part and the second part, or a production support placed between two rotating-joint devices that are assembled one on the other.

20. The installation according to claim 18, wherein the production process further comprises the step of providing multiple strips of different materials and the step of arranging the strips of different materials on the production support successively, sequentially, or in parallel, in a superposed and/or juxtaposed manner.

21. The installation according to claim 18, wherein the predetermined material consists of polyether ether ketone, referred to as PEEK, and/or derivative materials.

22. The installation according to claim 21, wherein the predetermined material also consists of polytetrafluoroethylene, referred to as PTFE, and/or derivative materials.

23. The installation according to claim 18, wherein the production process further comprises the step of arranging said at least one strip of a predetermined material around said production support under vacuum conditions.

24. The installation according to claim 18, wherein the production process further comprises the step of arranging said at least one strip of a predetermined material around said production support under a predetermined temperature.

25. The installation according to claim 18, wherein the production process further comprises, during the step of arranging said at least one strip of a predetermined material around said production support, a step of welding and/or bonding a lower layer formed by the strip with an upper layer formed by the strip.

26. The installation according to claim 18, wherein the production support is formed by a single annular piece or multiple annular segments.

27. The installation according to claim 18, wherein the production process further comprises, during the step of arranging said at least one strip of a predetermined material around said production support, a step of positioning an insert designed to house a receiving cavity inside the item blank.

28. The installation according to claim 27, wherein the insert is formed from a soluble material.

29. The installation according to claim 18, wherein the at least one strip of a predetermined material comes as a roll or individual strip.

30. The installation according to claim 20, wherein the predetermined material consists of polyether ether ketone, referred to as PEEK, and/or derivative materials.

31. The installation according to claim 20, wherein the production process further comprises the step of arranging said at least one strip of a predetermined material around said production support under vacuum conditions.

32. The installation according to claim 21, wherein the production process further comprises the step of arranging said at least one strip of a predetermined material around said production support under vacuum conditions.

33. The installation according to claim 22, wherein the production process further comprises the step of arranging said at least one strip of a predetermined material around said production support under vacuum conditions.

34. The installation according to claim 20, wherein the production process further comprises the step of arranging said at least one strip of a predetermined material around said production support under a predetermined temperature.

\* \* \* \* \*